(12) United States Patent
Kwon

(10) Patent No.: US 9,187,056 B1
(45) Date of Patent: Nov. 17, 2015

(54) AIRBAG APPARATUS

(71) Applicant: HYUNDAI MOBIS Co., Ltd., Yongin-si, Gyeonggi-do (KR)

(72) Inventor: Hae Wook Kwon, Yongin-si (KR)

(73) Assignee: HYUNDAI MOBIS CO., LTD., Yongin, Gyeonggi-do (KR)

( * ) Notice: Subject to any disclaimer, the term of this patent is extended or adjusted under 35 U.S.C. 154(b) by 0 days.

(21) Appl. No.: 14/656,779

(22) Filed: Mar. 13, 2015

(30) Foreign Application Priority Data

Aug. 27, 2014 (KR) .................. 10-2014-0112545

(51) Int. Cl.
*B60R 21/16* (2006.01)
*B60R 21/26* (2011.01)
*B60R 21/2338* (2011.01)
*B60R 21/239* (2006.01)

(52) U.S. Cl.
CPC ........... *B60R 21/2338* (2013.01); *B60R 21/239* (2013.01); *B60R 2021/2395* (2013.01); *B60R 2021/23382* (2013.01)

(58) Field of Classification Search
CPC ................. B60R 21/2338; B60R 2021/23382; B60R 21/239; B60R 2021/2395
See application file for complete search history.

(56) References Cited

U.S. PATENT DOCUMENTS

| | | | | |
|---|---|---|---|---|
| 8,191,925 B2 * | 6/2012 | Williams | ............ | B60R 21/2338 280/739 |
| 2012/0104734 A1 * | 5/2012 | Fischer | ............... | B60R 21/2338 280/730.1 |
| 2012/0235393 A1 * | 9/2012 | Fisher | ................. | B60R 21/2338 280/742 |
| 2013/0026744 A1 * | 1/2013 | Fischer | ............... | B60R 21/2338 280/742 |
| 2014/0300094 A1 * | 10/2014 | Williams | .............. | B60R 21/239 280/743.2 |
| 2014/0306434 A1 * | 10/2014 | Jang | ...................... | B60R 21/239 280/739 |

* cited by examiner

*Primary Examiner* — Faye M Fleming

(74) *Attorney, Agent, or Firm* — Paratus Law Group, PLLC

(57) ABSTRACT

Disclosed is an airbag apparatus of which the deployment pressure is adjusted. To this end, according to the airbag apparatus according to the exemplary embodiment of the present invention, a tether coupled to an airbag pulls a vent cover while being tightened by expansive force of the airbag so as to form a communicating hole, which is in communication with a vent hole, between the airbag and the vent cover, and allow the vent hole to be opened.

18 Claims, 14 Drawing Sheets

AIRBAG APPARATUS

CROSS-REFERENCE TO RELATED APPLICATIONS

The present application claims priority to Korean Patent Application Number 10-2014-0112545 filed Aug. 27, 2014, the entire contents of which the application is incorporated herein for all purposes by this reference.

TECHNICAL FIELD

The present invention relates to an airbag apparatus, and more particularly, to an airbag apparatus for a front passenger seat.

BACKGROUND

In general, airbag apparatuses, which are safety devices having airbags that are inflated at the time of an accident and protect an occupant, are provided in a vehicle.

The airbag apparatuses are installed at respective locations in the vehicle as necessary, and classified into an airbag apparatus for a driver seat which is mounted on a steering wheel so as to protect a driver seated in the driver seat, an airbag apparatus for a front passenger seat which is mounted at an upper side of a glove box so as to protect an occupant seated in a front passenger seat, and a curtain airbag apparatus which is mounted along a roof rail so as to protect a side of the occupant.

The airbag apparatuses each include an inflator which generates gas, and an airbag which is connected with the inflator and inflated and deployed when gas flows into the airbag so as to protect the occupant.

Meanwhile, while only adult persons can be seated in the driver seat, various occupants such as children, kids, and small adult persons as well as adult persons can be seated in the front passenger seat.

Therefore, in the case of the airbag apparatus for a front passenger seat, it is necessary to vary a point of time when the airbag is deployed and deployment pressure by adjusting a discharge rate of gas discharged from the airbag in accordance with the type of occupant.

SUMMARY

The present invention has been made in an effort to provide an airbag apparatus of which the deployment pressure is adjusted.

Technical problems of the present invention are not limited to the aforementioned technical problem, and other technical problems, which are not mentioned above, may be clearly understood by those skilled in the art from the following descriptions.

An exemplary embodiment of the present invention provides an airbag apparatus including: an airbag which is inflated when gas flows into the airbag, deployed forward toward an occupant, and has a vent hole through which the gas flowing into the airbag is discharged; a vent cover which shields the vent hole and is coupled to the airbag; and a tether which is coupled to the airbag, and pulls the vent cover while being tightened by expansive force of the airbag so as to form a communicating hole, which is in communication with the vent hole, between the airbag and the vent cover, and allow the vent hole to be opened.

Other detailed matters of the exemplary embodiment are included in the detailed description and the drawings.

According to the airbag apparatus according to the present invention, since the vent covers shield the vent holes when the airbag is initially deployed, gas in the airbag cannot be discharged to the outside of the airbag through the vent holes, such that the airbag may be quickly deployed.

After the airbag is fully deployed, the tether is tightened by expansive force of the airbag and pulls the vent covers, thereby forming the communicating holes, which are in communication with the vent holes, between the airbag and the vent covers. Accordingly, gas in the airbag sequentially passes through the communicating holes and the vent holes and then is discharged to the outside of the airbag, such that the head of the occupant is not injured due to expansive force of the airbag.

When the airbag is pressed by the occupant after being fully inflated, the tether is loosened again, and as a result, the vent covers shield the vent holes again, such that the airbag may maintain appropriate pressure, thereby preventing the airbag from bouncing vertically, and preventing the neck of the occupant from being injured.

The effect of the present invention is not limited to the aforementioned effect, and other effects, which are not mentioned above, will be clearly understood by those skilled in the art from the claims.

DETAILED DESCRIPTION

Figure 1:
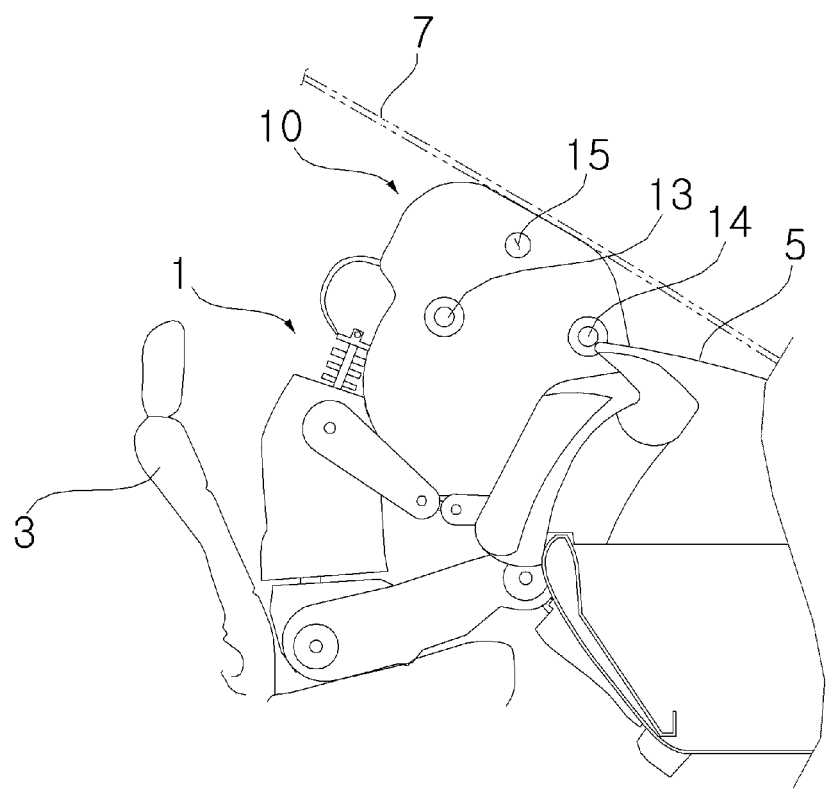
FIG. 1 is a view illustrating a state in which an airbag of an airbag apparatus according to a first exemplary embodiment of the present invention is pressed by an occupant after being fully inflated.

Various advantages and features of the present invention and methods for achieving the advantages and features will be clear with reference to exemplary embodiments described below in detail together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag apparatus according to exemplary embodiments of the present invention will be described with reference to the drawings.

FIG. 1 is a view illustrating a state in which an airbag of an airbag apparatus according to a first exemplary embodiment of the present invention is pressed by an occupant after being fully inflated.

Referring to FIG. 1, an airbag apparatus according to a first exemplary embodiment of the present invention includes an airbag 10 which is inflated when gas is generated by an inflator (not illustrated), which is a gas generator, and then flows into the airbag 10, and deployed forward toward an occupant 1. The airbag 10 is disposed in an airbag housing (not illustrated) installed in an instrument panel 5 in a state in which the airbag 10 is folded. When gas flows into the airbag 10, the airbag 10 tears an upper skin surface of the instrument panel 5 and protrudes upward from the instrument panel 5 while being inflated, and then is deployed into the interior of a vehicle through a portion between a windshield 7 and the instrument panel 5. That is, the airbag apparatus according to the first exemplary embodiment of the present invention is an airbag apparatus for a front passenger seat, which is installed to protect the occupant 1 seated on a front passenger seat 3. Here, the instrument panel 5 means a panel which is disposed in front of the front passenger seat 3 and has a glove box installed therein, and the windshield 7 means front glass of the vehicle.

A main vent hole 13, a low risk deployment (LRD) vent hole 14, and a vent hole 15, through which gas flowing into the airbag 10 is discharged, are formed in a side surface of the airbag 10.

The main vent hole 13 is always opened, and as a result, gas flowing into the airbag 10 is always discharged through the main vent hole 13.

The LRD vent hole 14 is opened to discharge gas when the airbag 10 is initially deployed, and as a result, initial deployment pressure of the airbag 10 is reduced, thereby preventing the occupant from being injured due to the initial deployment pressure of the airbag 10, when a small occupant (for example, a child) is seated on the front passenger seat. In addition, the LRD vent hole 14 is closed after the airbag 10 is fully inflated, thereby maintaining appropriate deployment pressure in the airbag 10.

When the airbag 10 is initially deployed, the vent hole 15 is closed to cut off discharge of gas so as to allow the airbag 10 to be quickly deployed, and after the airbag 10 is fully inflated, the vent hole 15 is opened to discharge gas so as to prevent the head of the occupant from being injured due to excessive deployment pressure of the airbag 10. In addition, when the airbag 10 is pressed by the occupant after being fully inflated, the vent hole 15 is closed again to cut off discharge of gas and prevent the airbag 10 from bouncing vertically, thereby preventing the head of the occupant from being tilted backward and preventing the neck of the occupant from being injured. In the present invention, because a vent cover 20, which opens and closes the vent hole 15, and a tether 30 are installed on the airbag 10, the main vent hole 13 and the LRD vent hole 14 are not illustrated in the following drawings including FIG. 2A.

Figure 2A:
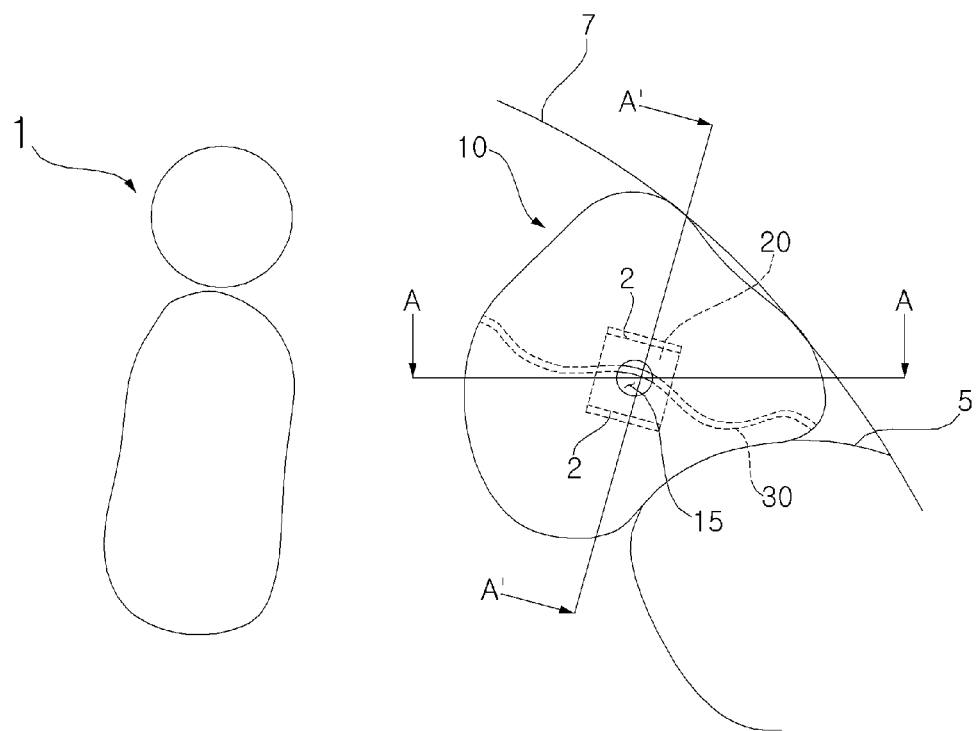
FIG. 2A is a view illustrating a state in which the airbag of the airbag apparatus according to the first exemplary embodiment of the present invention is initially deployed.
Figure 2B:
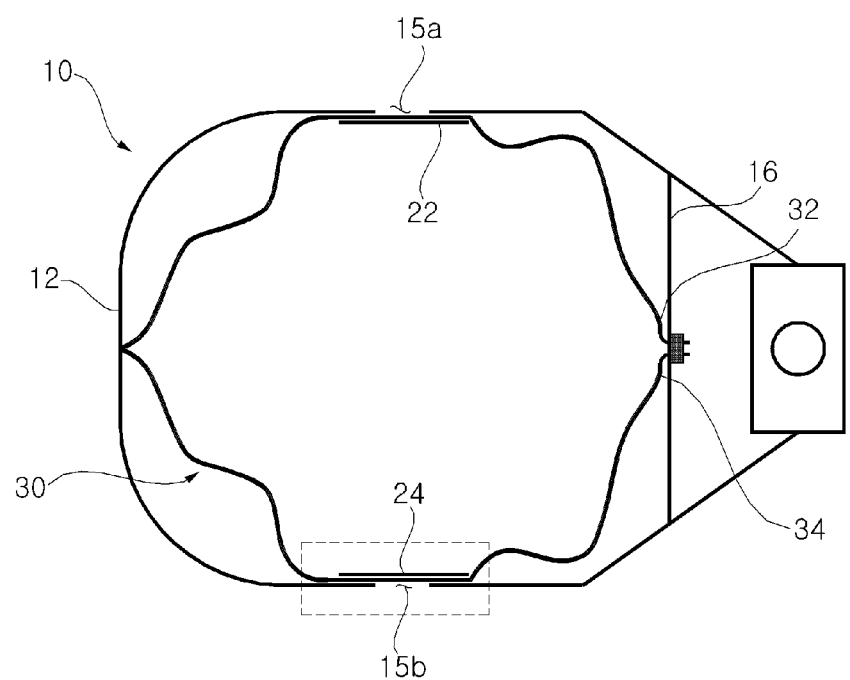
FIG. 2B is a cross-sectional view taken along line A-A of FIG. 2A.
Figure 2C:
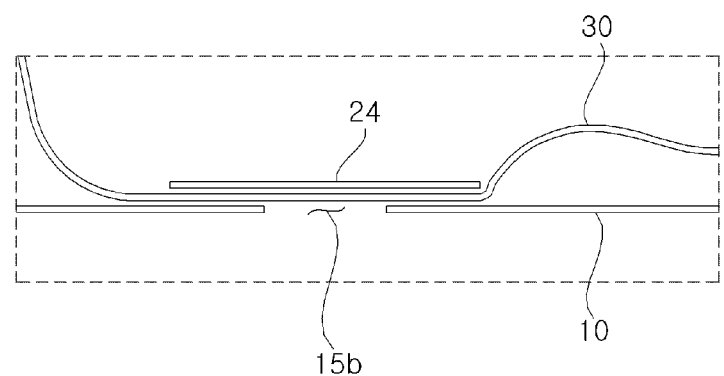
FIG. 2C is an enlarged view of a portion defined by a dotted line of FIG. 2B.
Figure 2D:
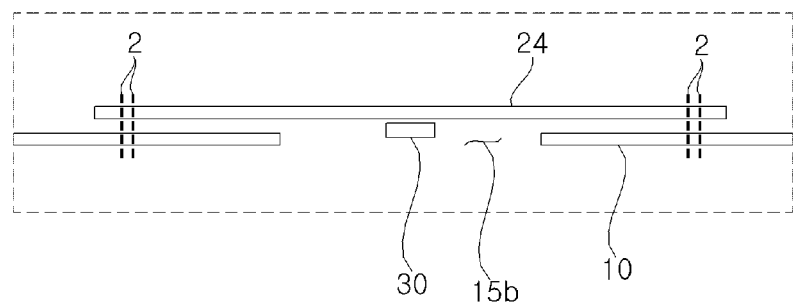
FIG. 2D is a cross-sectional view taken along line A'-A' of FIG. 2A.

FIG. 2A is a view illustrating a state in which the airbag of the airbag apparatus according to the first exemplary embodiment of the present invention is initially deployed, FIG. 2B is a cross-sectional view taken along line A-A of FIG. 2A, FIG. 2C is an enlarged view of a portion defined by a dotted line of FIG. 2B, and FIG. 2D is a cross-sectional view taken along line A'-A' of FIG. 2A.

Referring to FIGS. 2A to 2D, the vent cover 20 is coupled to an inner surface of the airbag 10. The vent cover 20 is formed in a quadrangular shape having an area enough to shield the vent hole 15, and covers the vent hole 15 so as to shield the vent hole 15.

Only upper and lower ends of the vent cover 20 are sewed on and coupled to a side surface of the airbag 10 using a thread 2. That is, the upper and lower ends of the vent cover 20 are coupled to the airbag 10, and front and rear ends of the vent cover 20 are separated from the airbag 10. Therefore, a passage may be formed in front and rear directions between the side surface of the airbag 10 and the vent cover 20. The tether 30 is inserted into the passage, and installed to be movable in the front and rear directions.

The vent holes 15 are formed in both surfaces of the airbag 10, respectively. That is, the vent holes 15 include a first vent hole 15a formed in one surface of the airbag 10, and a second vent hole 15b formed in the other surface of the airbag 10. In addition, the vent covers 20 include a first vent cover 22 which shields the first vent hole 15a and is coupled to the one surface of the airbag 10, and a second vent cover 24 which shields the second vent hole 15b and is coupled to the other surface of the airbag 10.

A center 36 in a longitudinal direction of the tether 30 is coupled to a front surface 12 inside the airbag 10, one end 32 of the tether 30 passes through the passage between the airbag 10 and the first vent cover 22 and then is coupled to a rear surface 16 inside the airbag 10, and the other end 34 of the tether 30 passes through the passage between the airbag 10 and the second vent cover 24 and then is coupled to the rear surface 16 inside the airbag 10. Both of the ends 32 and 34 of the tether 30 may be coupled to the same position of the rear surface 16 of the airbag 10.

The center 36 in the longitudinal direction of the tether 30 is coupled to a center in a left and right direction of the front surface 12 of the airbag 10, and both of the ends 32 and 34 of the tether 30 are coupled to a center in the left and right direction of the rear surface 16 of the airbag 10. In a state in which the tether 30 is coupled to the airbag 10, the center 36 in the longitudinal direction of the tether 30 and both of the ends 32 and 34 are disposed at positions that correspond to each other in the front and rear direction.

The tether 30 may be made of a flexible material, and may be coupled to the airbag 10 by sewing. The tether 30 may be made of the same material as the airbag 10.

The tether 30 may be moved forward and rearward while passing through the passage between the airbag 10 and the first vent cover 22, and may be moved forward and rearward while passing through the passage between the airbag 10 and the second vent cover 24.

An operation of the airbag apparatus according to the first exemplary embodiment of the present invention, which is configured as described above, will be described below.

Referring to FIGS. 2A to 2D, when the airbag 10 is initially deployed, the tether 30 is in a loosened state and does not pull the vent covers 22 and 24. Therefore, when the airbag 10 is initially deployed, the vent covers 22 and 24 shield the vent holes 15a and 15b.

Therefore, when the airbag 10 is initially deployed, gas in the airbag 10 cannot be discharged to the outside of the airbag 10 through the vent holes 15a and 15b, and as a result, the airbag 10 may be quickly deployed at the initial time, such that the airbag 10 may be deployed at an appropriate point of time when the occupant may be protected.

Figure 3A:
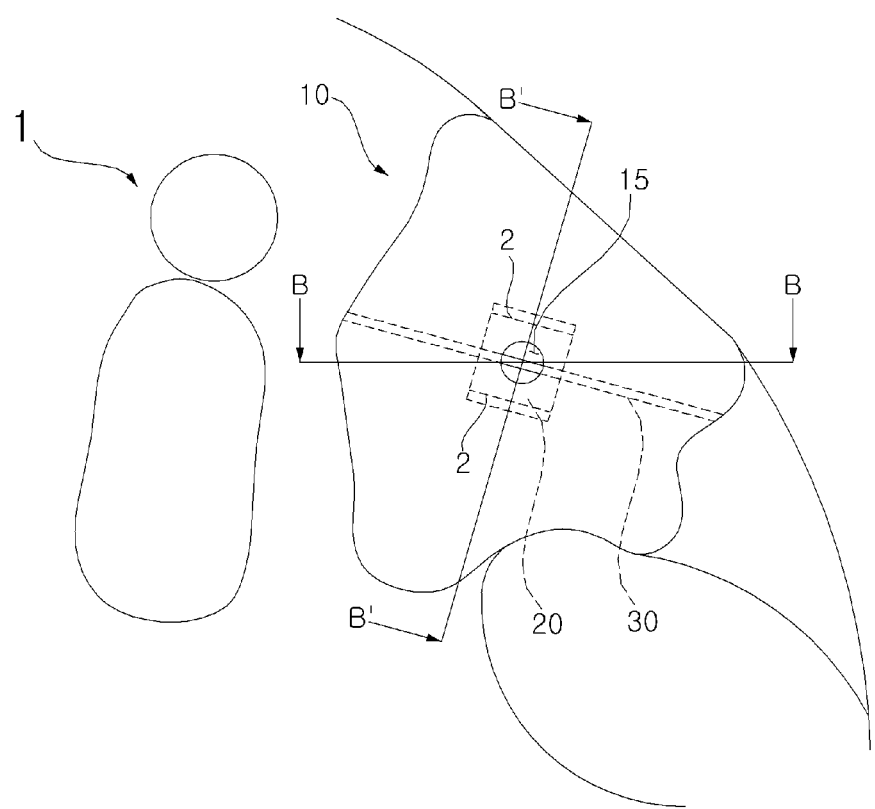
FIG. 3A is a view illustrating a state in which the airbag of the airbag apparatus according to the first exemplary embodiment of the present invention is fully inflated.
Figure 3B:
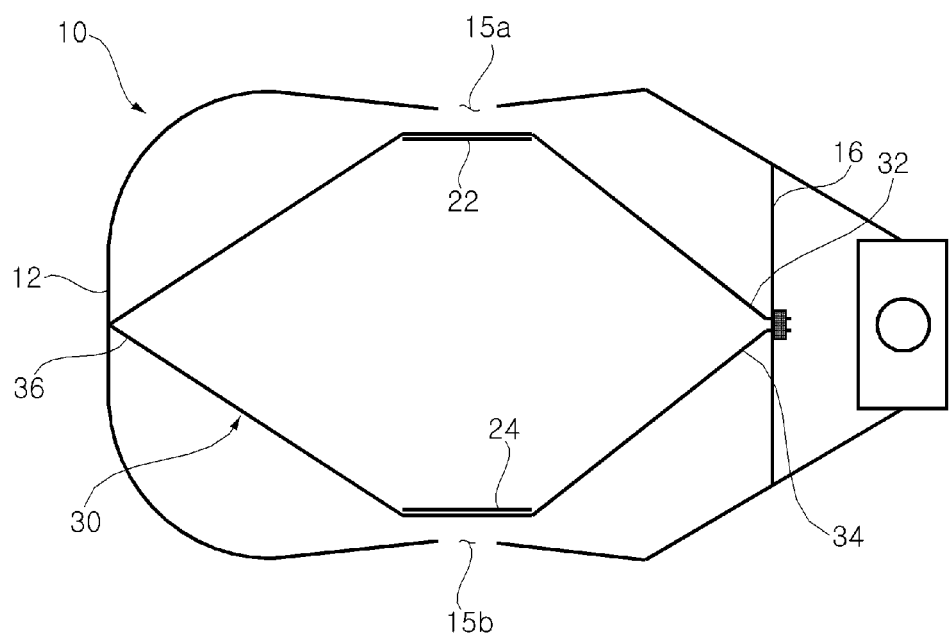
FIG. 3B is a cross-sectional view taken along line B-B of FIG. 3A.
Figure 3C:
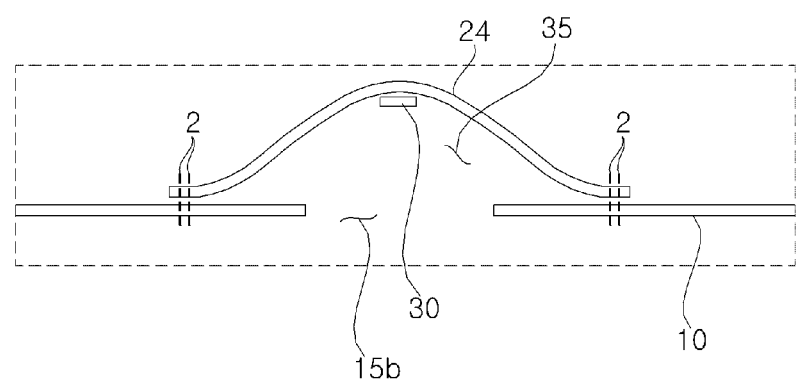
FIG. 3C is a cross-sectional view taken along line B'-B' of FIG. 3A.

FIG. 3A is a view illustrating a state in which the airbag of the airbag apparatus according to the first exemplary embodiment of the present invention is fully inflated, FIG. 3B is a cross-sectional view taken along line B-B of FIG. 3A, and FIG. 3C is a cross-sectional view taken along line B'-B' of FIG. 3A.

Referring to FIGS. 3A to 3C, when the airbag 10 is fully inflated, the tether 30 is tightened by expansive force of the airbag 10, and pulls the vent covers 22 and 24. When the tether 30 pulls the vent covers 22 and 24 as described above, the vent covers 22 and 24 are moved toward the interior of the airbag 10. Therefore, a portion between the airbag 10 and the first vent cover 22 and a portion between the airbag 10 and the second vent cover 24 are spread out, such that communicating holes 35 are formed, respectively. The communicating holes 35 are in communication with the vent holes 15a and 15b, and thereby, the vent holes 15a and 15b are opened. Therefore, gas in the airbag 10 sequentially passes through the communicating holes 35 and the vent holes 15a and 15b, and then is discharged to the outside of the airbag 10.

As described above, gas in the airbag 10 sequentially passes through the communicating holes 35 and the vent holes 15a and 15b and then is discharged to the outside of the airbag 10 after the airbag 10 is fully inflated and immediately before the occupant comes into contact with the front surface 12 of the airbag 10, thereby preventing the head of the occupant from being injured due to excessive deployment pressure of the airbag 10.

Figure 4A:
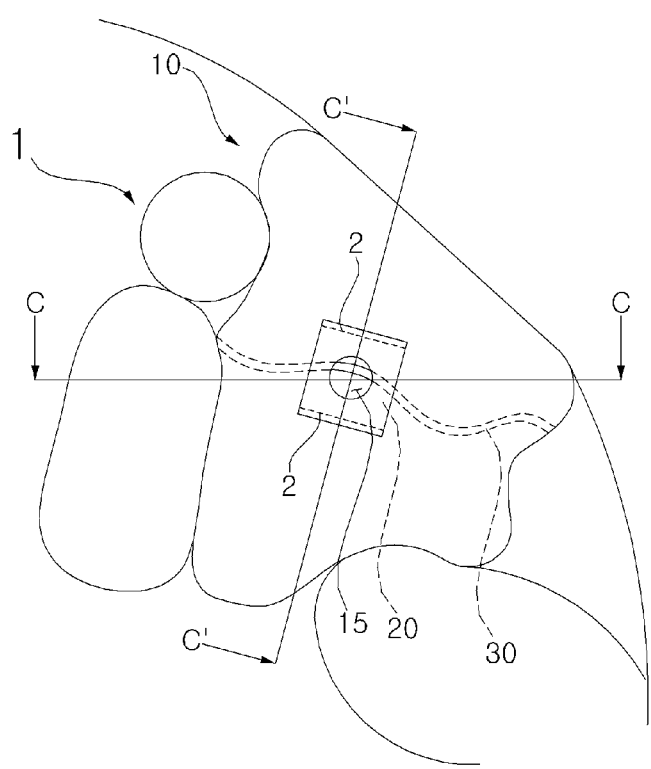
FIG. 4A is a view illustrating a state in which the airbag of the airbag apparatus according to the first exemplary embodiment of the present invention is pressed by an occupant after being fully inflated.
Figure 4B:
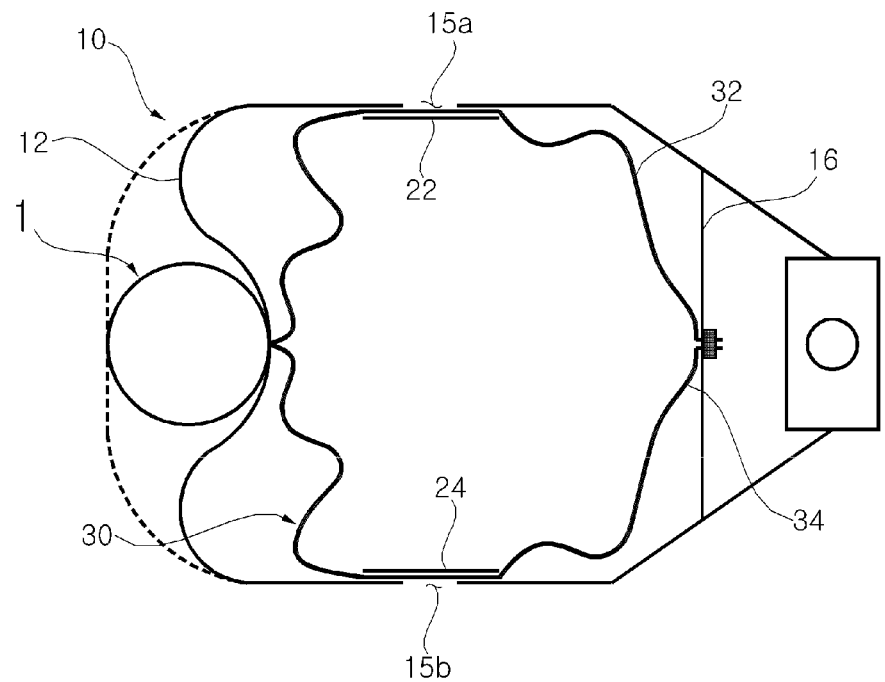
FIG. 4B is a cross-sectional view taken along line C-C of FIG. 4A.
Figure 4C:
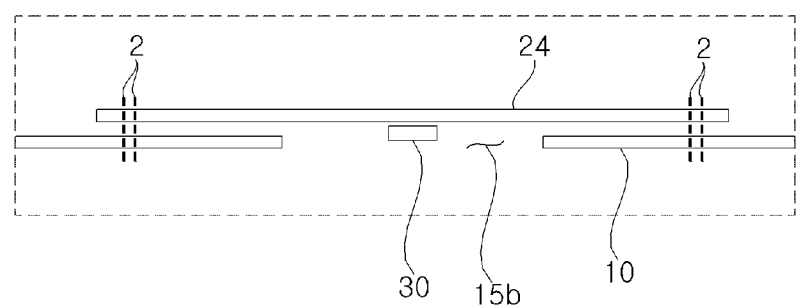
FIG. 4C is a cross-sectional view taken along line C'-C' of FIG. 4A.

FIG. 4A is a view illustrating a state in which the airbag of the airbag apparatus according to the first exemplary embodiment of the present invention is pressed by the occupant after being fully inflated, FIG. 4B is a cross-sectional view taken along line C-C of FIG. 4A, and FIG. 4C is a cross-sectional view taken along line C'-C' of FIG. 4A.

Referring to FIGS. 4A to 4C, when the airbag 10 is fully inflated and then the front surface 12 is pressed by the occupant, the tether 30 is loosened again, and the vent covers 22 and 24 are restored to the original positions and shield the vent holes 15a and 15b again. Therefore, gas in the airbag 10 is no longer discharged to the outside through the vent holes 15a and 15b, and as a result, the airbag 10 maintains appropriate pressure that may protect the occupant.

That is, in a case in which an excessive amount of gas is discharged after the airbag 10 is fully inflated, expansive force of the airbag 10 becomes too low, and as a result, the airbag 10 bounces vertically. In this case, the head of the occupant is tilted backward due to the airbag 10 that bounces vertically, and as a result, the neck of the occupant is likely to be injured. However, according to the airbag apparatus according to the first exemplary embodiment of the present invention, since the vent covers 22 and 24 shield the vent holes 15a and 15b when the front surface 12 is pressed by the occupant after the airbag 10 is fully inflated, the airbag 10 does not bounce vertically, thereby preventing the neck of the occupant from being injured.

The vent covers 22 and 24 may be made of the same material as the airbag 10. In addition, the vent covers 22 and 24 may also be formed as an elastic member having elastic force, which is extended when being pulled by the tether 30, and restored when the tether 30 is loosened. Here, the elastic member is made of rubber.

Figure 5A:
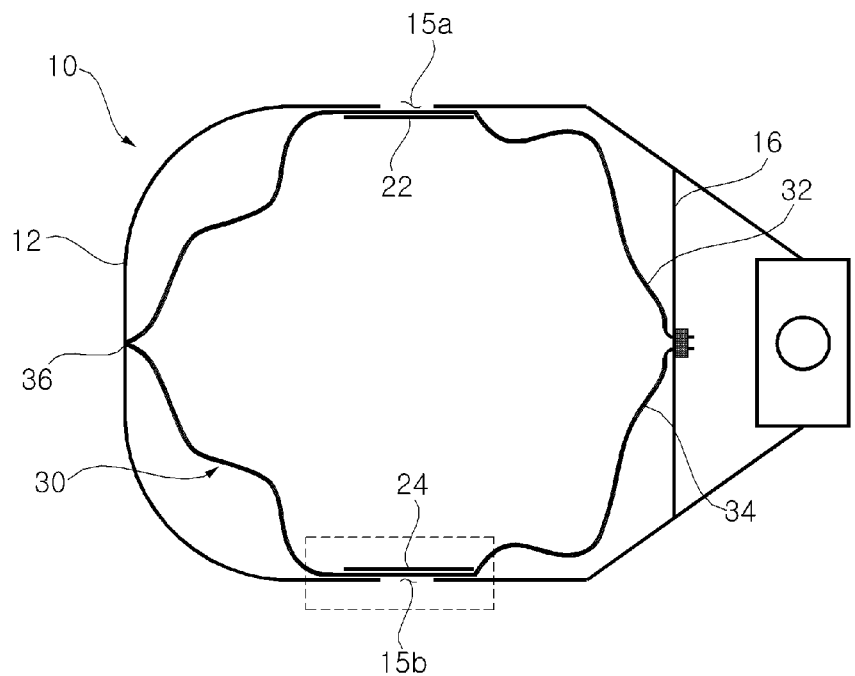
FIG. 5A is a cross-sectional view of an airbag apparatus according to a second exemplary embodiment of the present invention.
Figure 5B:
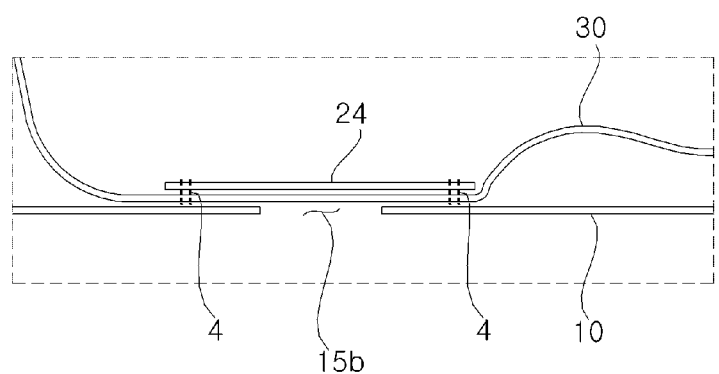
FIG. 5B is an enlarged view of a portion defined by a dotted line of FIG. 5A.

FIG. 5A is a cross-sectional view of an airbag apparatus according to a second exemplary embodiment of the present invention, and FIG. 5B is an enlarged view of a portion defined by a dotted line of FIG. 5A. Hereinafter, like reference numerals refer to constituent elements identical to those of the aforementioned first exemplary embodiment, a description thereof will be omitted, and only differences between the exemplary embodiments will be described.

Referring to FIGS. 5A and 5B, it can be seen that the airbag apparatus according to the second exemplary embodiment of the present invention differs from the airbag apparatus according to the aforementioned first exemplary embodiment.

That is, the second exemplary embodiment is identical to the aforementioned first exemplary embodiment in that the center 36 in the longitudinal direction of the tether 30 is coupled to the center in the left and right direction of the front surface 12 of the airbag 10, one end 32 of the tether 30 is inserted between the side surface of the airbag 10 and the first vent cover 22 and then coupled to the center in the left and right direction of the rear surface 16 of the airbag 10, and the other end 34 of the tether 30 is inserted between the side surface of the airbag 10 and the second vent cover 24 and then coupled to the center in the left and right direction of the rear surface of the airbag 10.

However, in the aforementioned first exemplary embodiment, the tether 30 is disposed to be movable forward and rearward between the side surface of the airbag 10 and the first vent cover 22, and disposed to be movable forward and rearward between the side surface of the airbag 10 and the second vent cover 24, but in the second exemplary embodiment, a portion of the tether 30, which is disposed between the side surface of the airbag 10 and the first vent cover 24, is coupled to the first vent cover 22, and a portion of the tether 30, which is disposed between the side surface of the airbag 10 and the second vent cover 24, is coupled to the second vent cover 24. The portion of the tether 30, which is disposed between the side surface of the airbag 10 and the first vent cover 22, may be sewed on and coupled to the first vent cover 22 using the thread 4, and the portion of the tether 30, which is disposed between the side surface of the airbag 10 and the second vent cover 24, may be sewed on and coupled to the second vent cover 24 using the thread 4.

Figure 6A:
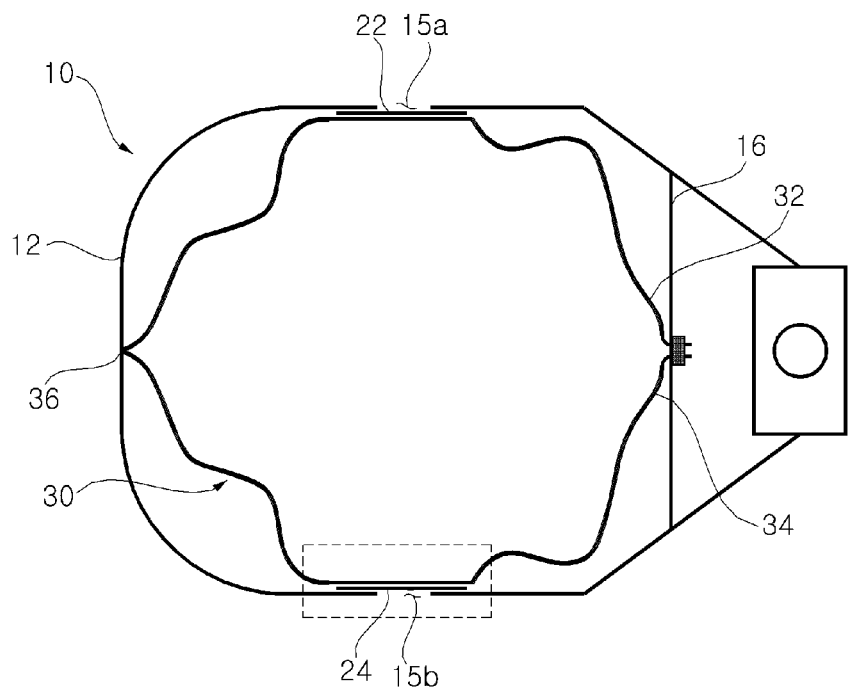
FIG. 6A is a cross-sectional view of an airbag apparatus according to a third exemplary embodiment of the present invention.
Figure 6B:
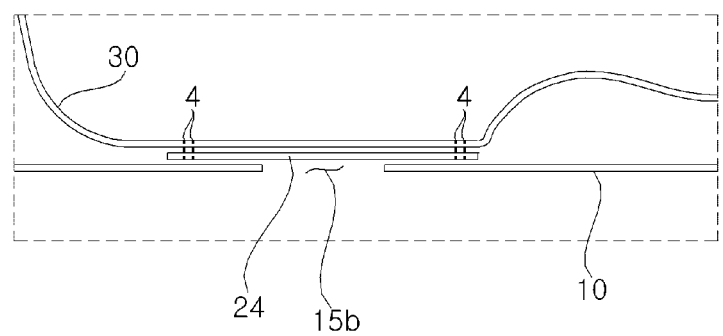
FIG. 6B is an enlarged view of a portion defined by a dotted line of FIG. 6A.

FIG. 6A is a cross-sectional view of an airbag apparatus according to a third exemplary embodiment of the present invention, and FIG. 6B is an enlarged view of a portion defined by a dotted line of FIG. 6A. Hereinafter, like reference numerals refer to constituent elements identical to those of the aforementioned second exemplary embodiment, a description thereof will be omitted, and only differences between the exemplary embodiments will be described.

Referring to FIGS. 6A and 6B, it can be seen that the airbag apparatus according to the third exemplary embodiment of the present invention differs from the airbag apparatus according to the aforementioned second exemplary embodiment.

That is, the third exemplary embodiment is identical to the aforementioned second exemplary embodiment in that the center 36 in the longitudinal direction of the tether 30 is coupled to the center in the left and right direction of the front surface 12 of the airbag 10, one end 32 of the tether 30 is coupled to the center in the left and right direction of the rear surface 16 of the airbag 10, and the other end 34 of the tether 30 is coupled to the center in the left and right direction of the rear surface 16 of the airbag 10.

However, in the aforementioned second exemplary embodiment, the portion of the tether 30, which is coupled to the first vent cover 22, is disposed between the side surface of the airbag 10 and the first vent cover 22, and the portion of the tether 30, which is coupled to the second vent cover 24, is disposed between the side surface of the airbag 10 and the second vent cover 24, but in the third exemplary embodiment, the tether 30 is coupled to an inner surface of the first vent cover 22 instead of being disposed between the side surface of the airbag 10 and the first vent cover 22, and coupled to an inner surface of the second vent cover 24 instead of being disposed between the side surface of the airbag 10 and the second vent cover 24. The tether 30 may be sewed on and coupled to the vent covers 22 and 24 using the thread 4.

Figure 7A:
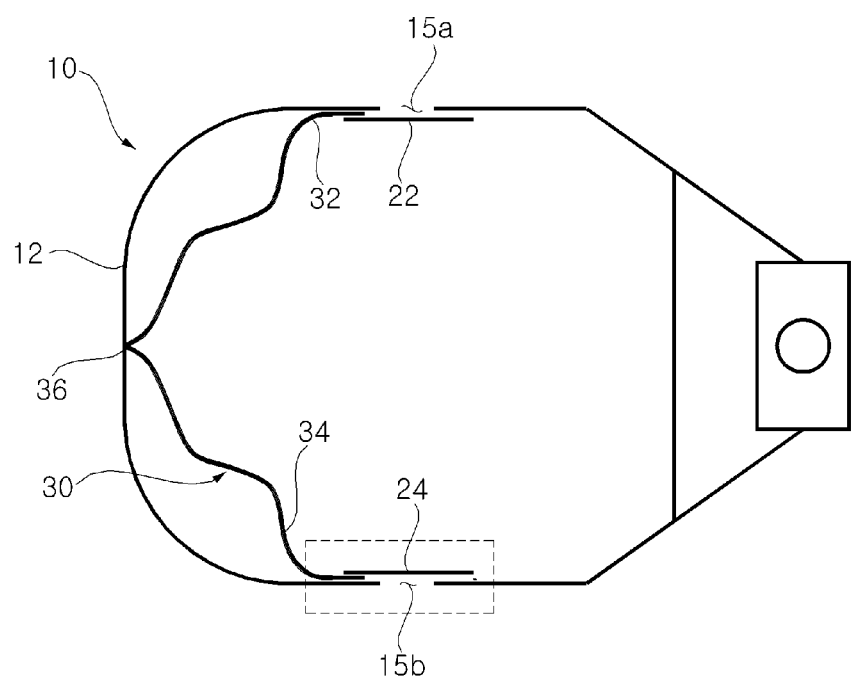
FIG. 7A is a cross-sectional view of an airbag apparatus according to a fourth exemplary embodiment of the present invention.
Figure 7B:
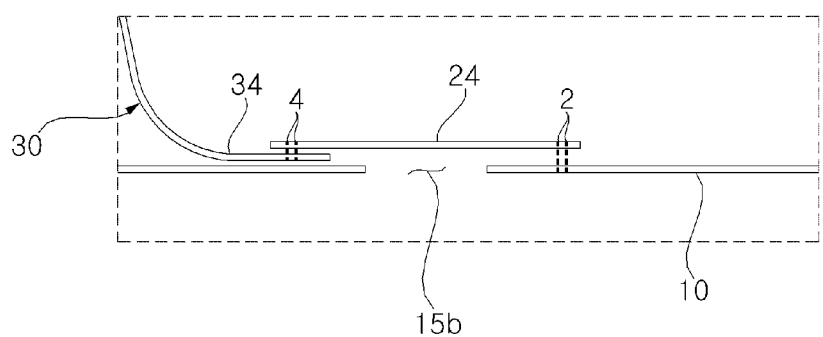
FIG. 7B is an enlarged view of a portion defined by a dotted line of FIG. 7A.

FIG. 7A is a cross-sectional view of an airbag apparatus according to a fourth exemplary embodiment of the present invention, and FIG. 7B is an enlarged view of a portion defined by a dotted line of FIG. 7A. Hereinafter, like reference numerals refer to constituent elements identical to those of the aforementioned first exemplary embodiment, a description thereof will be omitted, and only differences between the exemplary embodiments will be described.

Referring to FIGS. 7A and 7B, it can be seen that the airbag apparatus according to the fourth exemplary embodiment of the present invention differs from the airbag apparatus according to the aforementioned first exemplary embodiment.

That is, the fourth exemplary embodiment is identical to the first exemplary embodiment in that the center in the longitudinal direction of the tether 30 is coupled to the center in the left and right direction of the front surface of the airbag 10.

However, in the aforementioned first exemplary embodiment, one end 32 of the tether 30 is inserted between the side surface of the airbag 10 and the first vent cover 22 and then coupled to the center in the left and right direction of the rear surface 16 of the airbag 10, and the other end 34 of the tether 30 is inserted between the side surface of the airbag 10 and the second vent cover 24 and then coupled to the center in the left and right direction of the rear surface 16 of the airbag 10, but in the fourth exemplary embodiment, one end 32 of the tether 30 is inserted between the side surface of the airbag 10 and the first vent cover 22 and then coupled to the first vent cover 22, and the other end 34 of the tether 30 is inserted into the side surface of the airbag 10 and the second vent cover 24 and then coupled to the second vent cover 24. Both of the ends 32 and 34 of the tether 30 may be sewed on and coupled to the vent covers 22 and 24 using the thread 4. Of course, one end 32 of the tether 30 may be coupled to the inner surface of the first vent cover 22 without being inserted between the side surface of the airbag 10 and the first vent cover 22, and the other end 34 of the tether 30 may be coupled to the inner surface of the second vent cover 24 without being inserted between the side surface of the airbag 10 and the second vent cover 24.

In the fourth exemplary embodiment, both of the ends 32 and 34 of the tether 30 may be coupled to the vent covers 22 and 24 to be in front of the vent holes 15a and 15b. In addition, in the fourth exemplary embodiment, the tether 30 may be shorter than the tether 30 according to the aforementioned first exemplary embodiment.

In the aforementioned first exemplary embodiment, only the upper and lower ends of the vent covers 22 and 24 are sewed on and coupled to the side surface of the airbag 10 using the thread 2, but in the fourth exemplary embodiment, the rear ends of the vent covers 22 and 24 may also be sewed on and coupled to the side surface of the airbag 10 using the thread 2.

Figure 8A:
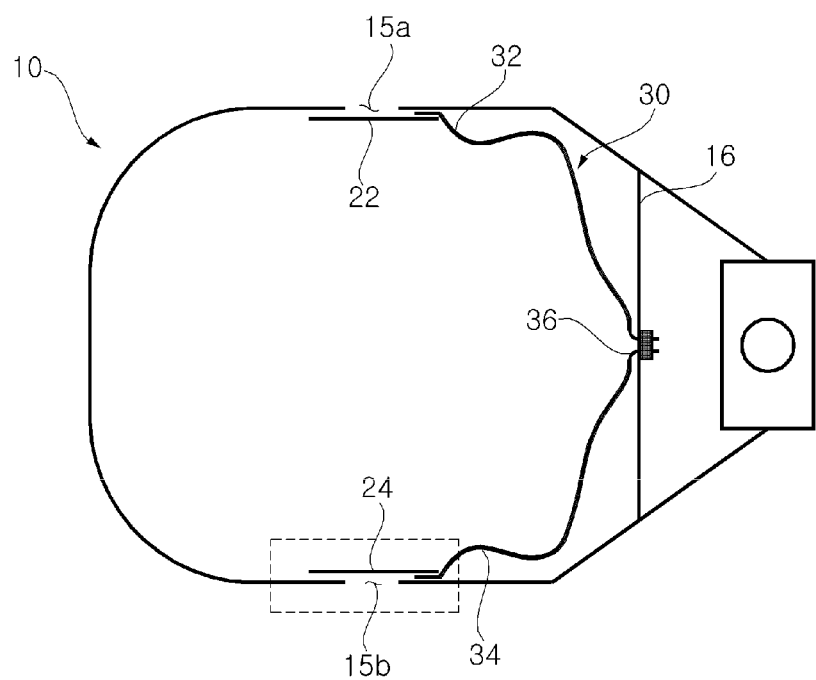
FIG. 8A is a cross-sectional view of an airbag apparatus according to a fifth exemplary embodiment of the present invention.
Figure 8B:
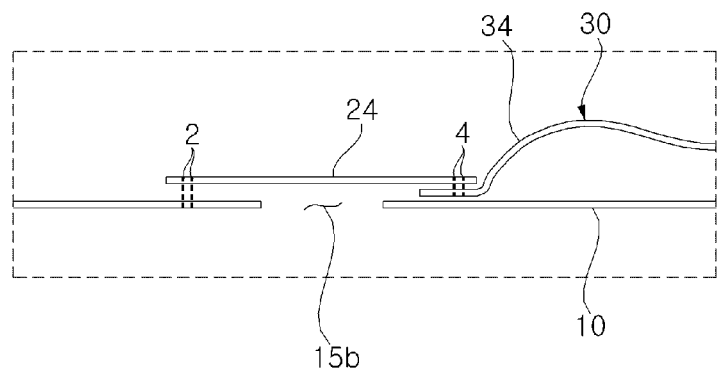
FIG. 8B is an enlarged view of a portion defined by a dotted line of FIG. 8A.

FIG. 8A is a cross-sectional view of an airbag apparatus according to a fifth exemplary embodiment of the present invention, and FIG. 8B is an enlarged view of a portion defined by a dotted line of FIG. 8A. Hereinafter, like reference numerals refer to constituent elements identical to those of the aforementioned fourth exemplary embodiment, a description thereof will be omitted, and only differences between the exemplary embodiments will be described.

Referring to FIGS. 8A and 8B, it can be seen that the airbag apparatus according to the fifth exemplary embodiment of the present invention differs from the airbag apparatus according to the aforementioned fourth exemplary embodiment.

That is, the fifth exemplary embodiment is identical to the aforementioned fourth exemplary embodiment in that one end 32 of the tether 30 is coupled to the first vent cover 22 between the side surface of the airbag 10 and the first vent cover 22, and the other end of the tether 30 is coupled to the second vent cover 24 between the side surface of the airbag 10 and the second vent cover 24. Both of the ends 32 and 34 of the tether 30 may be sewed on and coupled to the vent covers 22 and 24 using the thread 4. Of course, one end 32 of the tether 30 may be coupled to the inner surface of the first vent cover 22 without being inserted between the side surface of the airbag 10 and the first vent cover 22, and the other end 34 of the tether 30 may be coupled to the inner surface of the second vent cover 24 without being inserted between the side surface of the airbag 10 and the second vent cover 24.

However, in the aforementioned fourth exemplary embodiment, the center 36 in the longitudinal direction of the tether 30 is coupled to the center in the left and right direction of the front surface 12 of the airbag 10, but in the fifth exemplary embodiment, the center 36 in the longitudinal direction of the tether 30 is coupled to the center in the left and right direction of the rear surface 16 of the airbag 10.

In the fifth exemplary embodiment, both of the ends 32 and 34 of the tether 30 may be coupled to the vent covers 22 and 24 at the rear of the vent holes 15a and 15b. In addition, in the aforementioned fourth exemplary embodiment, not only the upper and lower ends of the vent covers 22 and 24 but also the rear ends of the vent covers 22 and 24 are sewed on and coupled to the side surface of the airbag 10 using the thread 2, but in the fifth exemplary embodiment, the rear ends of the vent covers 22 and 24 are not coupled to the side surface of the airbag 10, but the front ends of the vent covers 22 and 24 are sewed on and coupled to the side surface of the airbag 10 using the thread 2.

Figure 9A:
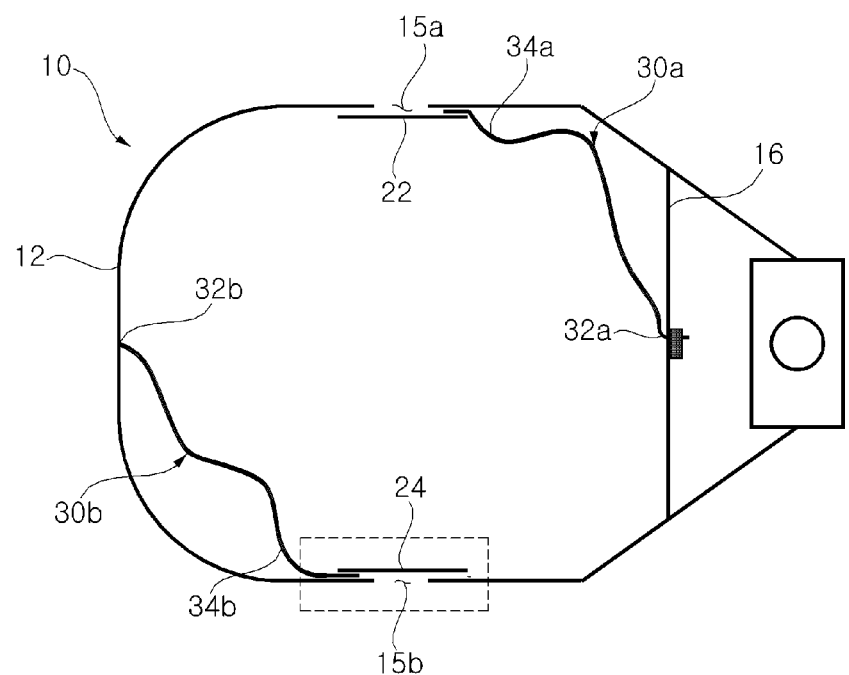
FIG. 9A is a cross-sectional view of an airbag apparatus according to a sixth exemplary embodiment of the present invention.
Figure 9B:
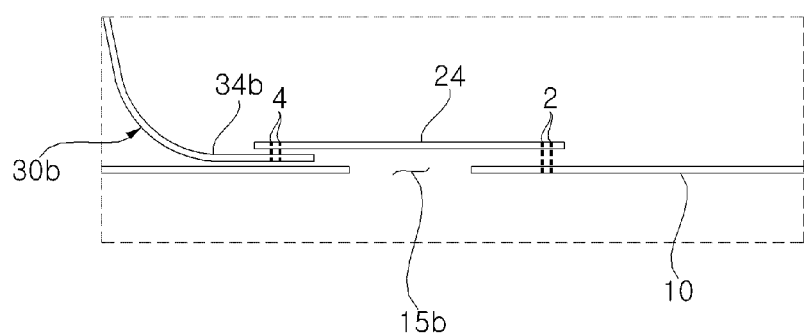
FIG. 9B is an enlarged view of a portion defined by a dotted line of FIG. 9A.

FIG. 9A is a cross-sectional view of an airbag apparatus according to a sixth exemplary embodiment of the present invention, and FIG. 9B is an enlarged view of a portion defined by a dotted line of FIG. 9A. Hereinafter, like reference numerals refer to constituent elements identical to those of the aforementioned first exemplary embodiment, a description thereof will be omitted, and only differences between the exemplary embodiments will be described.

Referring to FIGS. 9A and 9B, it can be seen that the airbag apparatus according to the sixth exemplary embodiment of the present invention differs from the airbag apparatus according to the aforementioned first exemplary embodiment.

That is, in the aforementioned first exemplary embodiment, the single tether 30 is provided, the center 36 in the longitudinal direction of the tether 30 is coupled to the center in the left and right direction of the front surface 12 of the airbag 10, one end 32 of the tether 30 is inserted between the side surface of the airbag 10 and the first vent cover 22 and then coupled to the center in the left and right direction of the rear surface 16 of the airbag 10, and the other end 34 of the tether 30 is inserted between the side surface of the airbag 10 and the second vent cover 24 and then coupled to the center in the left and right direction of the rear surface 16 of the airbag 10.

However, in the sixth exemplary embodiment, two tethers 30a and 30b are provided. That is, the tethers 30a and 30b include a first tether 30a and a second tether 30b. One end 32a of the first tether 30a is coupled to the center in the left and right direction of the rear surface 16 of the airbag 10, and the other end 34a of the first tether 30a is coupled to the first vent cover 22 between the side surface of the airbag 10 and the first vent cover 22. In addition, one end 32b of the second tether 30b is coupled to the center in the left and right direction of the front surface 12 of the airbag 10, and the other end 34b of the second tether 30b is coupled to the second vent cover 24 between the side surface of the airbag 10 and the second vent cover 24. Of course, the other end 34a of the first tether 30a may be coupled to the inner surface of the first vent cover 22 without being inserted between the side surface of the airbag 10 and the first vent cover 22, and the other end 34b of the second tether 30b may be coupled to the inner surface of the second vent cover 24 without being inserted between the side surface of the airbag 10 and the second vent cover 24.

The other end 34a of the first tether 30a may be sewed on and coupled to the first vent cover 22 at the rear of the first vent hole 15a using the thread 4, and the other end 34b of the second tether 30b may be sewed on and coupled to the second vent cover 24 in front of the second vent hole 15b using the thread 4.

In the aforementioned first exemplary embodiment, only the upper and lower ends of the vent covers 22 and 24 are sewed on and coupled to the side surface of the airbag 10 using the thread 2, but in the sixth exemplary embodiment, the front end of the first vent cover 22 is also sewed on and coupled to the side surface of the airbag 10 using the thread 2, and the rear end of the second vent cover 24 is also sewed on and coupled to the side surface of the airbag 10 using the thread 2.

Figure 10A:
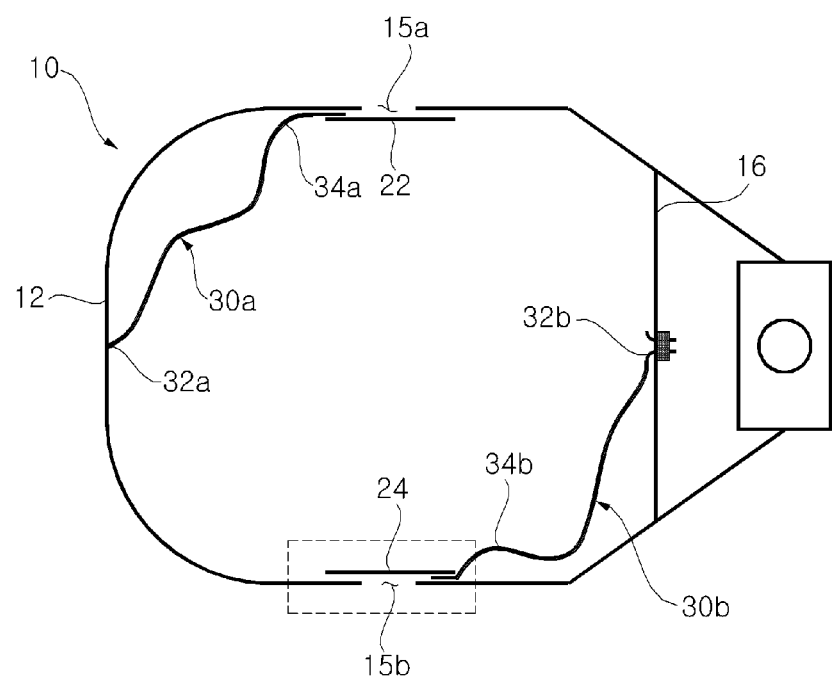
FIG. 10A is a cross-sectional view of an airbag apparatus according to a seventh exemplary embodiment of the present invention.
Figure 10B:
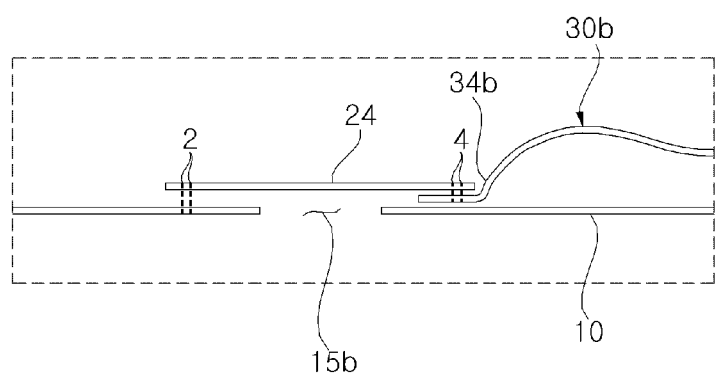
FIG. 10B is an enlarged view of a portion defined by a dotted line of FIG. 10A.

FIG. 10A is a cross-sectional view of an airbag apparatus according to a seventh exemplary embodiment of the present invention, and FIG. 10B is an enlarged view of a portion defined by a dotted line of FIG. 10A. Hereinafter, like reference numerals refer to constituent elements identical to those of the aforementioned sixth exemplary embodiment, a description thereof will be omitted, and only differences between the exemplary embodiments will be described.

Referring to FIGS. 10A and 10B, it can be seen that the airbag apparatus according to the seventh exemplary embodiment of the present invention differs from the airbag apparatus according to the aforementioned sixth exemplary embodiment.

That is, in the aforementioned sixth exemplary embodiment, one end 32a of the first tether 30a is coupled to the rear surface 16 of the airbag 10, and the other end 34a of the first tether 30a is coupled to the first vent cover 22. In addition, in the aforementioned sixth exemplary embodiment, one end 32b of the second tether 30b is coupled to the front surface 12 of the airbag 10, and the other end 34b of the second tether 30b is coupled to the second vent cover 24.

However, in the seventh exemplary embodiment, one end 32a of the first tether 30a is coupled to the front surface 12 of the airbag 10, and the other end 34a of the first tether 30a is coupled to the first vent cover 22. In addition, in the seventh exemplary embodiment, one end 32b of the second tether 30b is coupled to the rear surface 16 of the airbag 10, and the other end 34b of the second tether 30b is coupled to the second vent cover 24.

In the seventh exemplary embodiment, the other end 34a of the first tether 30a is sewed on the first vent cover 22 in front of the first vent hole 15a using the thread 4, and the other end 34b of the second tether 30b is sewed on and coupled to the second vent cover 24 at the rear of the second vent hole 15b using the thread 4.

In the aforementioned first exemplary embodiment, only the upper and lower ends of the vent covers 22 and 24 are coupled to the side surface of the airbag 10 using the thread 2, but in the seventh exemplary embodiment, the rear end of the first vent cover 22 is also sewed on and coupled to the side surface of the airbag 10 using the thread 2, and the front end of the second vent cover 24 is also sewed on and coupled to the side surface of the airbag 10 using the thread 2.

As described above, according to the airbag apparatus according to the present invention, since the vent covers 22 and 24 shield the vent holes 15a and 15b when the airbag 10 is initially deployed, gas in the airbag 10 cannot be discharged to the outside of the airbag 10 through the vent holes 15a and 15b, such that the airbag 10 may be quickly deployed.

After the airbag 10 is fully deployed, the tether 30 is tightened by expansive force of the airbag 10 and pulls the vent covers 22 and 24, thereby forming the communicating holes 35, which are in communication with the vent holes 15a and 15b, between the airbag 10 and the vent covers 22 and 24. Accordingly, gas in the airbag 10 sequentially passes through the communicating holes 35 and the vent holes 15a and 15b and then is discharged to the outside of the airbag 10, such that the head of the occupant is not injured due to expansive force of the airbag 10.

When the front surface 12 is pressed by the occupant after the airbag 10 is fully inflated, the tether 30 is loosened again, and as a result, the vent covers 22 and 24 shield the vent holes 15a and 15b again, such that the airbag 10 may maintain appropriate pressure, thereby preventing the airbag 10 from bouncing vertically, and preventing the neck of the occupant from being injured.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning of the scope of the claims, the scope of the claims, and the equivalents thereto, are included in the scope of the present invention.

What is claimed is:

1. An airbag apparatus comprising:
    an airbag which is inflated when gas flows into the airbag, deployed forward toward an occupant, and has a vent hole through which the gas flowing into the airbag is discharged;
    a vent cover which shields the vent hole and is coupled to the airbag; and
    a tether which is coupled to the airbag, and pulls the vent cover while being tightened by expansive force of the airbag so as to form a communicating hole, which is in communication with the vent hole, between the airbag and the vent cover, and allow the vent hole to be opened.

2. The airbag apparatus of claim 1, wherein when the airbag is pressed by the occupant after being fully inflated, the tether is loosened again, and the vent cover shields the vent hole again.

3. The airbag apparatus of claim 1, wherein the vent cover is an elastic member that is extended when being pulled by the tether, and restored when the tether is loosened.

4. The airbag apparatus of claim 1, wherein the vent hole includes a first vent hole formed at one side of the airbag, and a second vent hole formed at the other side of the airbag, and the vent cover includes a first vent cover which shields the first vent hole and is coupled to one side of the airbag, and a second vent cover which shields the second vent hole and is coupled to the other side of the airbag.

5. The airbag apparatus of claim 4, wherein the tether is disposed to be movable forward and rearward between the airbag and the first vent cover and between the airbag and the second vent cover, a center in a longitudinal direction of the tether is coupled to a front surface of the airbag, and both ends of the tether are coupled to a rear surface of the airbag.

6. The airbag apparatus of claim 5, wherein the center in the longitudinal direction of the tether is coupled to a center in the left and right direction of the front surface of the airbag, and both of the ends of the tether are coupled to a center in the left and right direction of the rear surface of the airbag.

7. The airbag apparatus of claim 4, wherein the tether is coupled to the first vent cover and the second vent cover, a center in a longitudinal direction of the tether is coupled to a front surface of the airbag, and both ends of the tether are coupled to a rear surface of the airbag.

8. The airbag apparatus of claim 7, wherein the center in the longitudinal direction of the tether is coupled to a center in a left and right direction of the front surface of the airbag, and both of the ends of the tether are coupled to a center in the left and right direction of the rear surface of the airbag.

9. The airbag apparatus of claim 7, wherein a portion of the tether, which is coupled to the first vent cover, is disposed between the airbag and the first vent cover, and a portion of the tether, which is coupled to the second vent cover, is disposed between the airbag and the second vent cover.

10. The airbag apparatus of claim 4, wherein a center in a longitudinal direction of the tether is coupled to a front surface of the airbag, one end of the tether is coupled to the first vent cover, and the other end of the tether is coupled to the second vent cover.

11. The airbag apparatus of claim 10, wherein the center in the longitudinal direction of the tether is coupled to a center in a left and right direction of the front surface of the airbag.

12. The airbag apparatus of claim 10, wherein the one end of the tether is disposed between the airbag and the first vent cover, and the other end of the tether is disposed between the airbag and the second vent cover.

13. The airbag apparatus of claim 4, wherein a center in a longitudinal direction of the tether is coupled to a rear surface of the airbag, one end of the tether is coupled to the first vent cover, and the other end of the tether is coupled to the second vent cover.

14. The airbag apparatus of claim 13, wherein the center in the longitudinal direction of the tether is coupled to a center in a left and right direction of the rear surface of the airbag.

15. The airbag apparatus of claim 13, wherein the one end of the tether is disposed between the airbag and the first vent cover, and the other end of the tether is disposed between the airbag and the second vent cover.

16. The airbag apparatus of claim 4, wherein the tether includes:
    a first tether which has one end coupled to a rear surface of the airbag, and the other end coupled to the first vent cover; and
    a second tether which has one end coupled to a front surface of the airbag, and the other end coupled to the second vent cover.

17. The airbag apparatus of claim 16, wherein one end of the first tether is coupled to a center in a left and right direction of the rear surface of the airbag, and one end of the second tether is coupled to a center in the left and right direction of the front surface of the airbag.

18. The airbag apparatus of claim 16, wherein the other end of the first tether is disposed between the airbag and the first vent cover, and the other end of the second tether is disposed between the airbag and the second vent cover.

* * * * *